April 13, 1926.
F. A. CROCKER
BELT
Filed Oct. 9, 1922
1,580,998
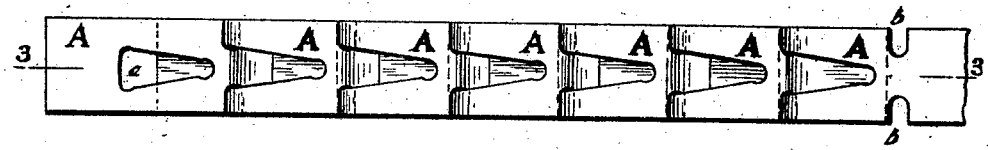
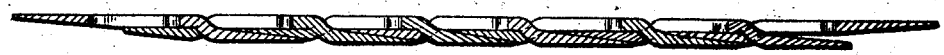
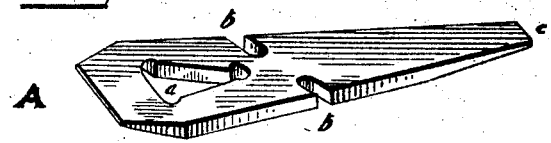
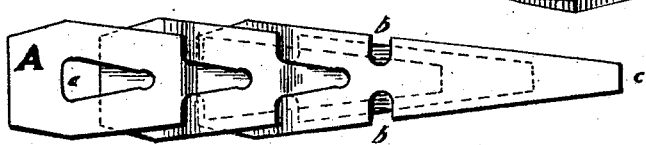
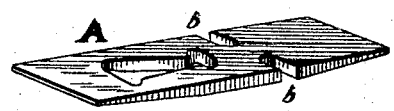
Inventor.
Fred A. Crocker.
Witnesses:
Howard L. Annis
Quincy L. Adams Patented Apr. 13, 1926.

1,580,998

UNITED STATES PATENT OFFICE.

FRED A. CROCKER, OF LINCOLN CENTER, MAINE.

BELT.

Application filed October 9, 1922. Serial No. 593,450.

*To all whom it may concern:*

Be it known that I, FRED A. CROCKER, citizen of the United States, residing at Lincoln Center, in the county of Penobscot and State of Maine, have invented certain new and useful Improvements in Belts; and I do hereby declare the following to be a full, clear, and exact description of the invention, such as will enable others skilled in the art to which it appertains to make and use the same.

My invention consists of a belt, formed of a series of identical links AA preferably constructed of flexible material, and especially of sole leather, so shaped and formed as that each link A may be detachably connected with the next link A, which is accomplished by the form of the link as shown and fully illustrated in the accompanying drawing in which—

Fig. 1 is a plan of the belt.

Fig. 2 is a side view of same.

Fig. 3 is a side view of same partly in section on line 3 3.

Fig. 4 is an isometric view of a link A.

Fig. 5 is a plan of belt formed of links having tapered tails.

Fig. 6 is an isometric view of a link A with tapered tail.

Similar letters refer to corresponding parts throughout the figures.

Each link A is formed with a longitudinal slot $a$ preferably triangular and of a length slightly longer than the width of the link, and also with transverse slots $bb$, one on each side of the link and preferably below the slot $a$, and of such dimensions as to receive and fit the inner side edges of the slot $a$ of the next link.

Each link is fitted to a second link by pushing one of its ends through the slot $a$ in the second and turning it so that the inner sides of the slot $a$ of the second link rest in the slots $bb$ of the first link. The junction of the two links is then complete and so continues for the whole length of the belt.

Both ends of the links are preferably skived to make a substantially even inner surface.

I do not confine myself to the exact shapes of the links as shown in the drawings which may be modified for use with different styles of pulleys, the essential features of my device being the slotting at $a$ and $bb$ which permits the union of the links, the locking them together, their detachment, the substitution of a new link in case of a break, and the lengthening or shortening of the belt. With an extra link in one's pocket it is obvious that a broken belt can be repaired anywhere by any one in a few moments, whereas belts, ordinarily being riveted or sewed, when broken require the services of a mechanic for repair.

My form of belt when made of leather is especially adapted for use in automobiles where belts of compositions containing rubber are largely used. Such belts being injuriously affected by the oil about the machinery deteriorate rapidly, whereas a belt of leather is rather helped than injured by contact with oil.

The tail end $c$ of the link may be formed tapering as shown in Figs. 5 and 6, which form permits the use of the belt with a V grooved pulley and gives the belt a stronger grip upon the pulley than where the form shown in Fig. 4 is used upon a flat faced pulley.

The tail end of the last link may be engaged with the slot $a$ of the first link and so form an endless belt.

Having thus described my invention, I claim and desire to secure by Letters Patent—

1. A link for a flexible belt, comprising a flat body of flexible material having its lateral edges converging from one end of the body to the other whereby the body is tapered from end to end, the body being formed in its broader end portion with a longitudinally extending slot, the said body being also formed in its said lateral edges between said slot and its narrower end, with oppositely located slots to accommodate the side walls of the first mentioned slot of another link when said narrower end of the first mentioned link is inserted through said first mentioned slot of said other link.

2. A flexible belt comprising interengaged links, each of said links comprising a flat body of flexible material formed near one end with a longitudinal slot decreasing in width toward the opposite end of the body, the said body being also formed, in its lateral edges, with slots extending directly inwardly therefrom and located on a transverse line between the narrow end of the first mentioned slot and the last mentioned end of the body approximately midway between the two ends of the body, the links being assembled with the last mentioned slots of each link accommodating the side walls of the first mentioned slot of the companion link.

FRED A. CROCKER.